(12) United States Patent
Dove et al.

(10) Patent No.: US 6,782,206 B1
(45) Date of Patent: Aug. 24, 2004

(54) MULTI-PORT OPTICAL NODE

(75) Inventors: Donald C. Dove, Kent, WA (US); Richard Joe Blount, Jr., Federal Way, WA (US); Simon Clive Hughes, Bellevue, WA (US)

(73) Assignee: Golden Bloom Resources, Ltd., Taipei (TW)

( * ) Notice: Subject to any disclaimer, the term of this patent is extended or adjusted under 35 U.S.C. 154(b) by 606 days.

(21) Appl. No.: 09/723,470

(22) Filed: Nov. 27, 2000

(51) Int. Cl.[7] .............................................. H04B 10/00
(52) U.S. Cl. ........................................ 398/117; 398/9
(58) Field of Search .................... 398/9, 117; 385/135; 361/600

(56) References Cited

U.S. PATENT DOCUMENTS

| | | | |
|---|---|---|---|
| 4,805,234 A | 2/1989 | Husbands ................... 455/607 |
| 5,412,497 A | * 5/1995 | Kaetsu et al. ............... 398/164 |
| 5,737,194 A | * 4/1998 | Hopkins et al. ............ 361/800 |
| 5,784,516 A | * 7/1998 | Parzygnat et al. .......... 385/134 |
| 5,854,703 A | 12/1998 | West, Jr. ..................... 359/167 |
| 5,896,477 A | 4/1999 | Stephenson et al. ........ 385/135 |
| 5,903,372 A | 5/1999 | Czerwiec .................... 359/135 |
| 5,956,169 A | 9/1999 | Shimizu ...................... 359/135 |
| 5,975,769 A | 11/1999 | Larson et al. ............... 385/135 |
| 5,987,203 A | 11/1999 | Abel et al. ................... 385/135 |
| 6,049,405 A | 4/2000 | Oberg ......................... 359/119 |
| 6,058,235 A | * 5/2000 | Hiramatsu et al. .......... 385/135 |
| 6,104,921 A | 8/2000 | Cosley et al. ............... 455/349 |
| 6,118,910 A | 9/2000 | Chang ......................... 385/135 |
| 6,147,786 A | 11/2000 | Pan ............................. 359/124 |
| 6,161,011 A | 12/2000 | Loveless ..................... 455/426 |
| 6,296,509 B1 | * 10/2001 | Leung et al. ............... 439/362 |
| 6,647,197 B1 | * 11/2003 | Marrs et al. ................ 385/134 |

* cited by examiner

*Primary Examiner*—Hung N. Hgo
(74) *Attorney, Agent, or Firm*—Black Lowe & Graham, PLLC

(57) ABSTRACT

A multi-port optical node is disclosed. The optical node is configured to send and receive optical and radio frequency data signals over a data distribution network. The data signals enter and exit the node through cables connected to ports of the main housing of the node. The main housing has a plurality of slots configured to accept a plurality of electronic modules. The electronic modules provide the basic functionality of the optical node including the power supply and transmitters and receivers for sending, receiving and converting of data signals. The electronic modules are approximately all the same size thus they can occupy any of the slots of the main housing. The modules further can be monitored and controlled via a serial system bus.

3 Claims, 3 Drawing Sheets

MULTI-PORT OPTICAL NODE

FIELD OF THE INVENTION

This invention relates to an improved method and apparatus for receiving and transmitting data signals over a multi-port optical node.

BACKGROUND OF THE INVENTION

In recent years, the Cable Television ("CATV") industry has been extending its traditional mandate by providing new television-based entertainment applications to even more and more subscribers. The new applications include for example, broadband telecommunications, interactive multimedia, and video on demand ("VOD"). As the variety of new applications and the number of subscribers continue to increase, the distribution systems for CATV plants (the physical implementation of the system) must be continually modified and upgraded. To handle the growth, the CATV equipment must be reliable and rapidly configurable. Such growth has led the CATV operators to change the implementation of distribution systems from an all coaxial tree-and-branch architecture to the multi-port optical node design used, for example, with fiber optic networks.

Optical nodes are the point of connection and conversion between the fiber optic cable and coaxial cable of a distributed network. The data from the headend service provider is usually sent over the fiber cable of the network to a plurality of preconfigured optical nodes for broadcast via the coaxial cable into a plurality of homes serviced by each of the optical nodes on the network. Depending on network architecture, each optical node has a plurality of ports for providing a direct connection between the optical node and the external network for converting an optical signal back to a Radio Frequency ("RF") signal for distribution in the CATV coaxial plant.

The major components of an optical node include an optical receiver which receives information-modulated light from an optical fiber and converts that information into an electrical signal, an optical transmitter which converts electrical signals that originate from the subscriber to information-modulated optical signals that are transported by optical fiber to a central location, a RF amplifier which provides additional gain and filtering for the electrical signals for distribution to subscribers, and a power supply which receives AC/DC electrical power for the optical node from the main cable or through a dedicated power line.

The typical optical node has its major components configured among electronic modules, fixed into specific slots in the node. The most prevalent optical node configuration in the market today has a total of four to six RF ports on the left and right sides of the optical node and which are serviced by a single RF amplifier module. One of the limitations of this configuration is that in the event of a failure of the circuitry driving one of the four ports, all four ports need to be removed from service to replace the offending RF module. As CATV delivery system reliability becomes increasingly important to be competitive with other telecommunication service providers, the up time of a system, as well as the number of subscribers affected by a given outage of service, become mission critical.

Another critical shortcoming with typical optical node implementation today is the ability of the system operators to have optical nodes that are field configurable. When modules are preconfigured and fixed into slots in an optical node, system planners have limited flexibility in how to configure the cables leading to the ports. A variety of environmental and space factors control how a node is ultimately installed at a location. This lack of flexibility in where the ports are on the node causes difficult installation requirements and, therefore, increases installation time. Little or no flexible expansion or configuration capability is typically available for an optical node installation today.

In yet another limitation of a typical configuration of an optical node, the electronic modules and slots of the optical node lack uniformity in size. Thus, electronic modules are limited to the slots of the node specifically built to house that particular module. This limits the system operator's ability to configure optical nodes for future expansion and forces them to over-configure individual nodes or add more nodes to the distribution network, both costly alternatives.

In still yet another limitation of a typical configuration of an optical node, power supplies that are rated for a fully loaded version of the optical node must be configured for each optical node. While this serves the long-term plans of a system build, the system operator is forced to buy much more capacity than is necessary for his short to intermediate term needs.

Therefore the intention of the present invention addresses inherent problems with current optical node design and deployment and presents the solution in a multi-port optical node that is scaleable, highly modular, and field configurable.

SUMMARY OF THE INVENTION

In accordance with the present invention, an improved multi-port optical node is described.

Multi-Port Optical Node

The optical node is integrated into a data distribution network with the optical node configured to send and receive data of the distribution network. The optical node comprises a main housing. The main housing provides environmental protection and a thermal path to the ambient environment sufficient to allow all components internal to the main housing to operate below their specified limits in the maximum ambient temperature. The main housing further comprises a plurality of slots for the coupling of a plurality of electronic modules to the main housing. The modules are connected to the main housing node through a module interface connector of the node. The electronic modules are system components of the main housing that control the electronic aspects of the optical node. The main housing further comprises a plurality of ports. The ports provide data connectivity between the optical node, the electronic modules and the distribution network.

In another aspect of the invention, the optical node is comprised of control interfaces for routing of the data of the distribution network over the optical and RF components of the optical node. Additionally, the optical node has an interface for the routing of power from the main power connector of the optical node to a plurality of electronic modules that comprise the optical node.

In another aspect of the invention, the optical node is comprised of a plurality of optical receiver modules, which receiver module receives information-modulated light from an optical fiber of the fiber management system and converts that information into an electrical signal for distribution over the data network.

In another aspect of the invention, the optical node comprises a plurality of optical transmitter modules, which transmitter modules convert electrical signals that originate primarily from the subscriber of the data services to information-modulated optical signals that are transported by optical fiber of the distribution network to a central location of the head end data service provider.

In another aspect of the invention, the optical node comprises a plurality of RF output modules, which RF output modules comprise the RF interface to the coaxial cable plant of the data distribution network via an AC/DC entry module and the main housing.

In another aspect of the invention, the optical node comprises at least one power supply module, which power supply module receives AC/DC electrical power for the optical node from the main cable or through a dedicated power line. The AC/DC power is converted to DC at regulated levels for distribution to any of the optical receivers, optical transmitters, and RF output modules deployed in the optical node.

In yet another aspect of the invention, return and transmit functions of the RF output, transmitter and receiver modules incorporate status monitoring for the purpose of controlling any of the plurality of the electronic modules via the external data cable and internally via the serial data bus of the optical node.

In yet another aspect of the invention, the optical node comprises at least one AC/DC entry module, which entry module provides the diplexing of the power and RF signals.

In still yet another aspect of the invention, the multi-port optical node comprises a uniform footprint of all modules. Thus, any module can be placed in any of the appropriate ports of the node.

In still yet another aspect of the invention, power supply modules can be added as needed to the optical node, including adding power modules to the node when the node has been activated on the distribution network.

In an alternative embodiment of the invention, there are two half-duplexed power supply modules of the optical node so that a plurality of power supply modules in parallel can power a plurality of electronic modules of the optical node.

Serial Data Bus

In another aspect of the present invention, there is provided a system and method for monitoring and controlling electronic module functions via a synchronous serial data bus of the optical node firmware. In the preferred embodiment of the invention, the serial data bus consists of wired and bi-directional, data and clock lines. The lines are connected to an electronic module via a module connector on the module controller.

BRIEF DESCRIPTION OF THE DRAWINGS

The many features and advantages of this invention are better understood with reference to the following detailed description of the preferred embodiment, along with the following drawings.

DETAILED DESCRIPTION OF THE PREFERRED EMBODIMENT

The present invention is a multi-port optical node that is integrated into a data distribution network. The optical node is configured to send and receive distribution network data between a data provider and a data subscriber. The data distribution network data is sent over the network from a service provider as optical data signals to the optical node, where the optical node receives the optical data signals and converts them to RF signals for distribution over a coax cable plant to the subscriber's equipment.

Figure 1:
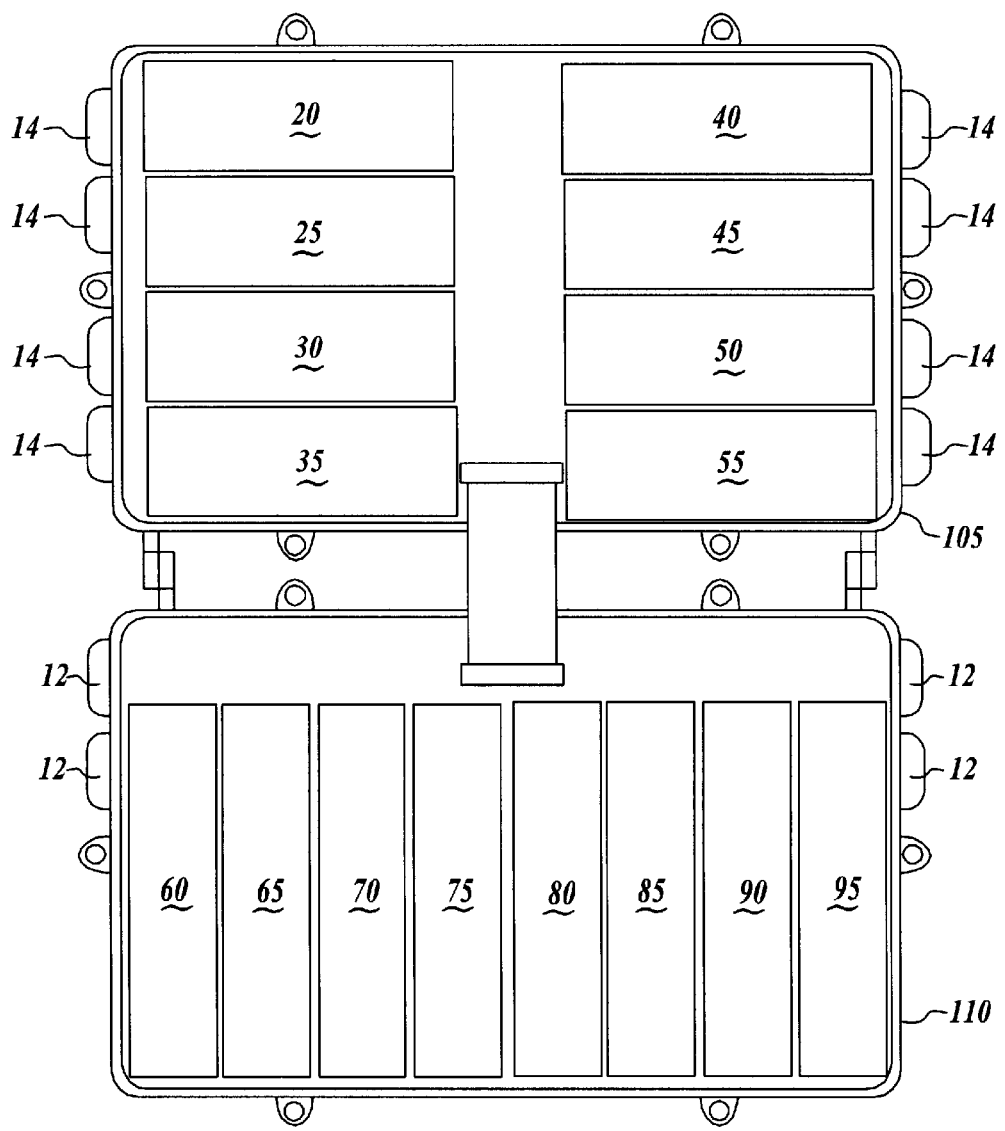
FIG. 1 is a top view of an embodiment of a main housing of the multi-port optical node.

FIG. 1 is a top view of the preferred embodiment of the multi-port optical node. The optical node has a main housing assembly 10 that is constructed into two sides, a main housing base 105 and a main housing lid 110. Each side of the optical node accommodates a plurality of slots 20–95. The slots are capable of accommodating an electronic module. The electronic module is a device that provides power supply to the optical node or sends and receives data signals through the node. The electronic modules are of a fixed dimension to ensure modularity. Both the housing base 105 and the housing lid 110 accommodate a plurality of modules. While the preferred embodiment is illustrated with a fixed plurality of slots for each of the sides of the main housing for the accommodation of the electronic modules, the number of slots is flexible to meet the installation requirements of a particular optical node.

The main housing 10 includes at least one main optical connector port 12 that provides the point of entry and exit for the optical data signals of the distribution network, and at least one coax cable plant port 14 that provides the point of exit for the converted optical data signals to RF data signals compatible with the receiving devices of the subscribers of the data distribution network. While the preferred embodiment is illustrated with a fixed plurality of ports for each of the sides of the main housing for the incoming and outgoing of data signals, the number of ports is flexible to meet the installation requirements of a particular optical node.

The electronic modules include but are not limited to an RF output module, power supply module, and optical transmitter and receiver module. The RF output module provides additional gain of the electronic data signals that are distributed to subscribers of the data services of the distribution network. The power supply module receives AC/DC electrical power for the optical node from the main cable or through a dedicated power line. The AC/DC power is converted to DC power at regulated levels for distribution to the RF output module, optical transmitter and receiver module, and other electronic components of the optical node. The transmitter module converts electrical signals to information-modulated optical signals that are transported by at least one optical fiber of the data distribution network back through the optical port 12. The receiver module receives the optical data signal from the optical fiber connected to the optical port 12 and converts that information into an electronic signal for distribution through the coax cable connected at the RF port 14.

The main housing slots are highly modular and configurable to accommodate multiple electronic module configurations in any of the plurality of the slots of the main housing 10. The housing base 105 and the housing lid 110 include a plurality of slots having approximately the same dimensions. An advantage of the present invention allows any of the electronic modules to be housed in any of the slots of the main housing 10. This allows the optical node to be configured at the site of installation by allowing modules to be added as needed. An additional advantage is that the modularity of the electronic modules allows the optical nodes to be more easily installed because the modules can be placed in a main housing slot in a location that is advantageous for positioning the node for cable connections.

Figure 2:
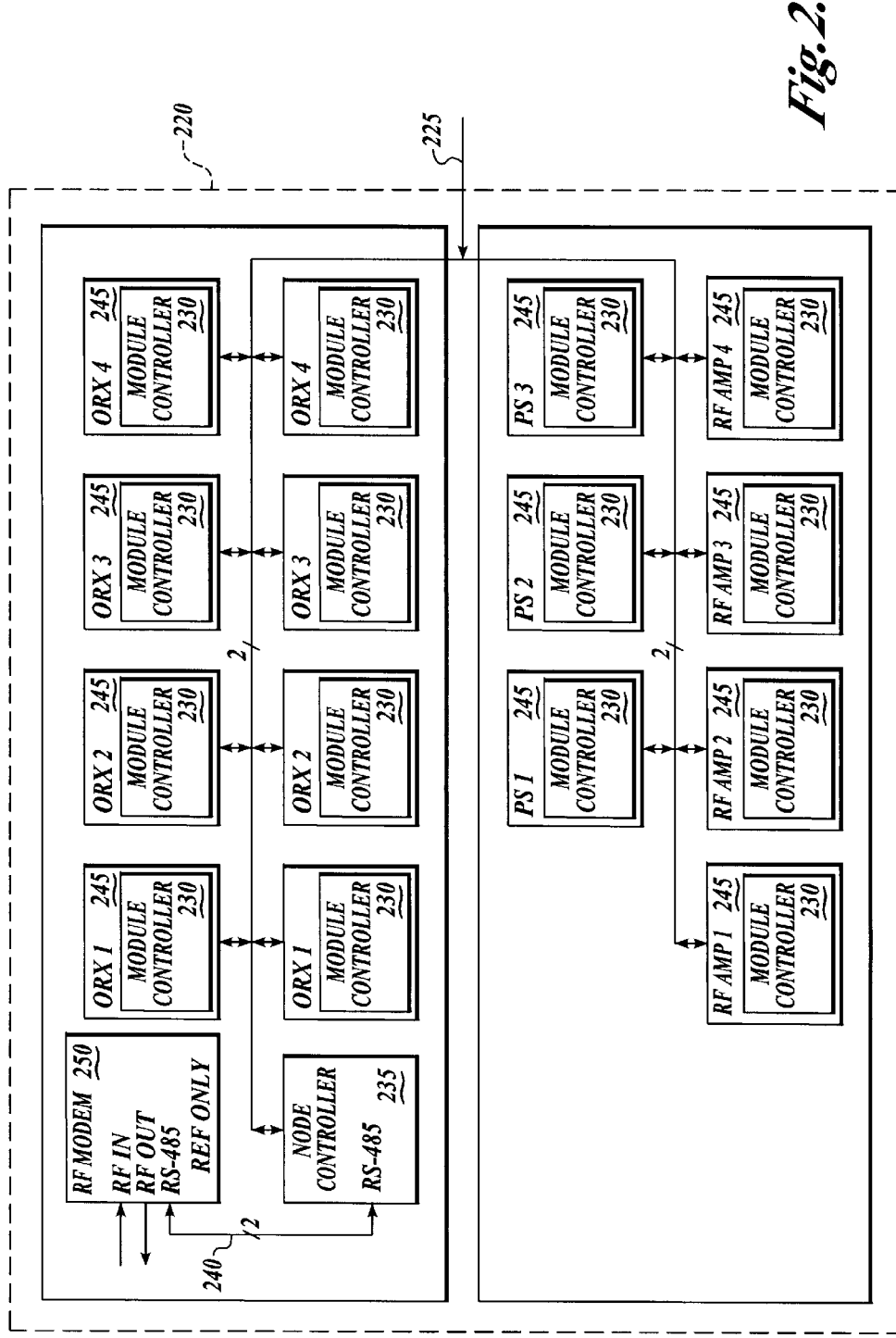
FIG. 2 is a block diagram of a data communications subsystem of the present invention.

The present invention monitors and controls node functions of the multi-port optical node. FIG. 2 is a block diagram of the preferred embodiment of a data communications system 220 to monitor and control the internal functions of the modules housed in the optical node. The system is preferably implemented through a 2-wire synchronous serial data bus 225. All control and data signals are routed through the electronic modules 245 over the synchronous serial data bus 225 through a connector on a module controller 230 included with each electronic module and through a node controller 235 included in the main housing 10. A serial interface 240, for example RS485, is implemented between an RF modem 250 included in the main housing 10 and the node controller 235 to support the addition of, and communication with network monitoring equipment. The node controller 235 provides the management for monitoring and controlling modules 245 of the data communication system 220. Furthermore, the node controller 235 includes a processor that is preprogrammed to view all modules 245 as having the same logical monitor and control capability. Thus, any module 235 in a slot can accept any system monitoring or control function carried out by the node controller 235. If the monitoring or control function is not applicable to a module 245, the module ignores the function. For example, if the node controller 235 sends out a data signal to power up a power supply, all modules receive the data but only the power supply module actually acts upon the data command. Further managed functions include, for example, the power to each module, the occupancy of a slot by a module, and other like functions. While the preferred embodiment of the present invention implements the monitoring and control system discussed below through firmware stored in non-volatile memory associated with an electronic module, the system can be implemented in other ways known in the art including, for example, via RAM chips, or EEPROMs or other comparable devices.

Referring to FIGS. 1 and 2, when a module is inserted in a slot, the module 245 is assigned by the module controller 230, by a processor included in the module, a unique identification code that is easily identifiable to the node controller 235 for monitoring and controlling the module. The node controller 235 uses this data for example, to detect a data signal, thereby sensing that a module is connected to a slot. When a module has been identified as being connected to a slot, it is further monitored over the data bus 225 to ascertain module problems and provide remote control of module functions via the node controller.

Figure 3:
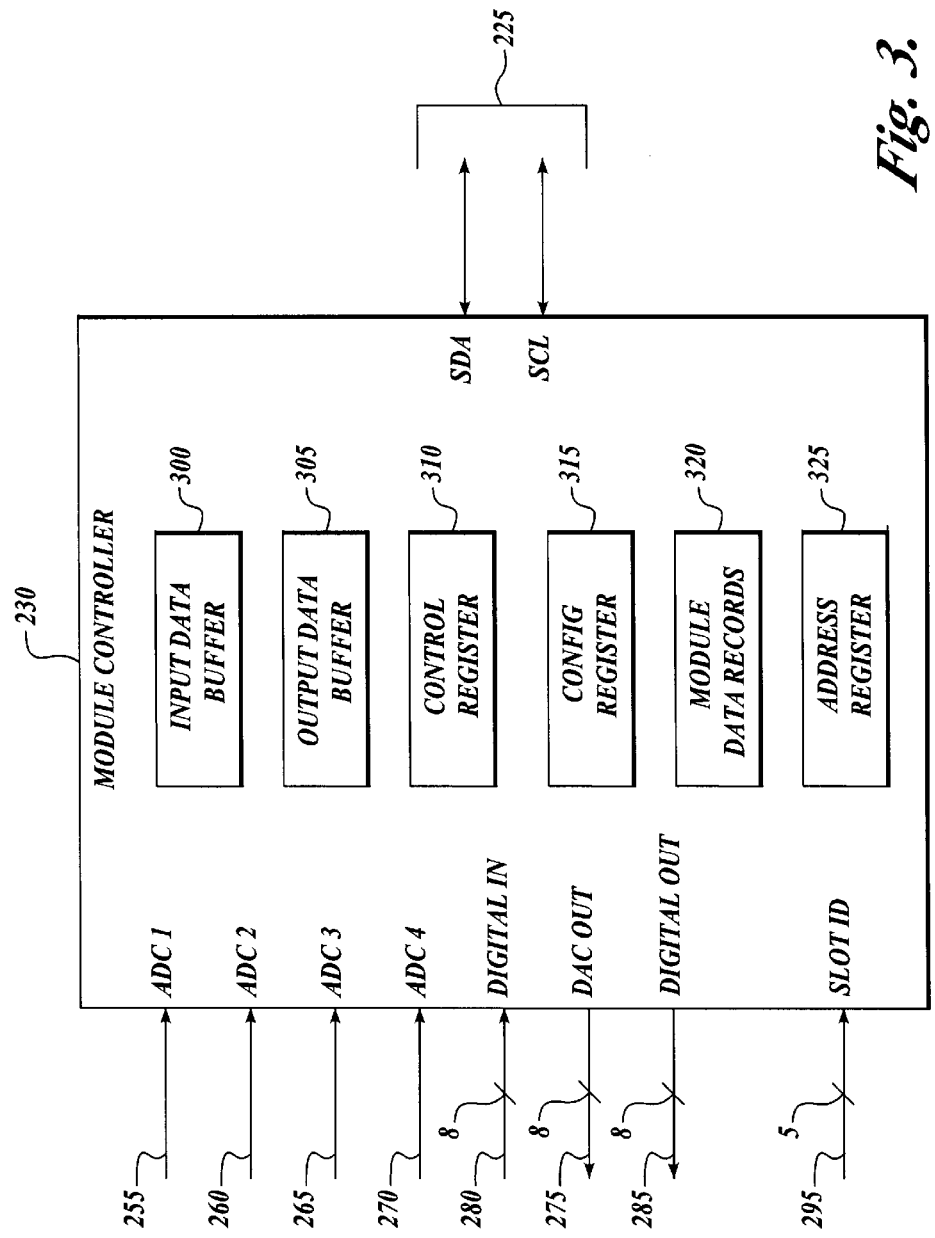
FIG. 3 is a functional diagram of a module controller used with the present invention.

FIG. 3 is a functional diagram of a preferred embodiment of a module controller 230 used with the present invention. Each module controller 230 provides non-volatile volatile storage memory for storing an electronic module model number, serial number, date of manufacture, and any calibration data required for module operation of the modules referred to earlier in FIG. 1 and any other module housed in the main housing 10 of the optical node. Referring to FIG. 2 and 3, the data routed over the serial bus 225 through the module controllers 230 is digital or analog and is appropriately converted as discussed below to its necessary signal for interpretation by the module controller 230. The module controller comprises a plurality of components that include analog-to-digital-converters ("ADCs") 255–270, at least one 8-bit digital-to-analog-converter ("DAC") 275, at least one 8-bit digital sense line 280, at least one 8-bit digital control line 285, and at least 4-bits for slot ID 295. Data representing measurements or the states of the slots are maintained in an appropriate input or output data buffer 300 and 305. The module controller 230 includes a control register 310 and a configuration register 315. The state of the module controller 230 (for example, on/off) and the nature of the data transfer expected for the monitoring and control of the optical node (for example, the data to be sent is a control function for modules 245) are provided by the control register 310 and the configuration register 315. Additionally, a module data records file 320 provides to the control register 310 and configuration register 315, a physical location and information about the module controller 230. An address register 325 holds the module controller's read/write address for receiving particular controlling data from the node controller 235. An advantage of the present invention is to use the slot location data of modules to move the modules to other slots when necessary with little or no downtime of the optical node.

While the preferred embodiment of the system to monitor and control the modules of the optical node is described above, the system can be implemented with a variety of permutations of the components described.

While this invention has been described in terms of preferred embodiments, there are alterations, permutations, and equivalents that fall within the scope of this invention. Accordingly, the scope of the invention is not limited by the disclosure of the preferred embodiment. Instead, the invention should be determined entirely by reference to the claims that follow, including all such alterations, permutations, and equivalents as fall within the true spirit and scope thereof.

The embodiments of the invention in which an exclusive property or privilege is claimed are defined as follows:

1. An optical node device for receiving optical data signals and converting the received optical data signals to RF signals, the device comprising:
    at least one optical connector port for sending and receiving optical data signals over a data distribution network;
    a cable plant port in signal communication with a cable plant;
    a plurality of module ports coupled to the at least one optical connector port and cable plant port;
    at least one optical transmitter and receiver module capable of being operable in any of the plurality of module ports for converting the received optical data signals to RF signals;
    at least RF output module capable of being operable in any of the plurality of module ports for outputting the RF signals to the cable plant via the cable plant port; and
    at least one power supply module capable of being received by any of the plurality of module ports.

2. The device of claim 1, wherein the device is coupled to an electrical power supply and the at least one power supply module converts electricity received from the power supply into an electrical current acceptable by the at least one RF output module and the at least one optical transmitter and receiver module.

3. The device of claim 2, wherein the plurality of module ports is sheltered against outside weather conditions by a housing.

* * * * *